US011018861B2

(12) United States Patent
Lo Conte

(10) Patent No.: US 11,018,861 B2
(45) Date of Patent: May 25, 2021

(54) SYSTEM AND METHOD FOR STORAGE AND MANAGEMENT OF CONFIDENTIAL INFORMATION

(71) Applicant: Piston Vault Pte. Ltd., Singapore (SG)

(72) Inventor: Francesco Lo Conte, Singapore (SG)

(73) Assignee: Piston Vault Pte. Ltd., Singapore (SG)

( * ) Notice: Subject to any disclaimer, the term of this patent is extended or adjusted under 35 U.S.C. 154(b) by 200 days.

(21) Appl. No.: 16/386,572

(22) Filed: Apr. 17, 2019

(65) Prior Publication Data
US 2020/0336306 A1 Oct. 22, 2020

(51) Int. Cl.
| H04L 29/06 | (2006.01) |
| H04L 9/08 | (2006.01) |
| G06F 21/78 | (2013.01) |
| H04L 9/32 | (2006.01) |
| H04L 9/06 | (2006.01) |

(52) U.S. Cl.
CPC ............ H04L 9/0897 (2013.01); G06F 21/78 (2013.01); H04L 9/0637 (2013.01); H04L 9/088 (2013.01); H04L 9/3247 (2013.01)

(58) Field of Classification Search
CPC ..... H04L 9/0897; H04L 9/0637; H04L 9/088; H04L 9/3247; G06F 21/78
See application file for complete search history.

(56) References Cited

U.S. PATENT DOCUMENTS

| 8,122,172 B2* | 2/2012 | Lu .......................... G06F 21/78 710/107 |
| 2005/0125668 A1* | 6/2005 | Botz ..................... G06F 21/445 713/171 |
| 2006/0259790 A1* | 11/2006 | Asokan ................. G06F 21/606 713/194 |
| 2013/0046990 A1* | 2/2013 | Fahrny .................. H04L 9/3247 713/176 |
| 2015/0046697 A1* | 2/2015 | Galpin .................... H04L 63/12 713/155 |
| 2017/0147807 A1* | 5/2017 | Rooyakkers ........... H04N 7/183 |
| 2019/0042765 A1* | 2/2019 | Chung .................... G06F 21/78 |
| 2019/0044696 A1* | 2/2019 | Aschauer .............. H04L 9/0897 |
| 2019/0095655 A1* | 3/2019 | Krawczewicz ........ H04W 12/06 |
| 2019/0169876 A1* | 6/2019 | Hennessy ............ E05B 19/0017 |
| 2019/0173676 A1* | 6/2019 | Hennessy ............. H04L 9/0897 |
| 2020/0313911 A1* | 10/2020 | Mondello ............. H04L 9/0861 |
| 2020/0336306 A1* | 10/2020 | Lo Conte ................ G06F 21/78 |

* cited by examiner

*Primary Examiner* — Sher A Khan
(74) *Attorney, Agent, or Firm* — Banner & Witcoff, Ltd.

(57) ABSTRACT

Embodiments of the invention provide system and method for storage and management of confidential information. The system comprises at least one electronic device, wherein each electronic device is configured to store confidential information, and execute a service request using the confidential information stored therein; a control system configured to provide power supply to any one of the at least one electronic device, which is connected to the control system, and communicate a service request from a specific user to an electronic device in connected state which is associated with the specific user; and an enclosure configured to house the at least one electronic device, and the control system.

24 Claims, 11 Drawing Sheets

SYSTEM AND METHOD FOR STORAGE AND MANAGEMENT OF CONFIDENTIAL INFORMATION

FIELD OF INVENTION

The invention relates to storage and management of confidential information, and more specifically to a system and method suitable for storage and management of confidential information, e.g., cryptographic keys, which can provide both secure storage of and on-demand access to the confidential information.

BACKGROUND

In cryptography, a cryptographic key is a piece of information or a string of bits that determines the functional output of a cryptographic algorithm. For encryption/decryption algorithms, a cryptographic key may be used to transform plain text into cipher text or vice versa. A cryptographic key may also be used to prove identity, since the owner of the key is the only one who can provide and use the key to successfully decrypt a relevant cipher text. Cryptographic keys are thus a core part of cryptographic operations, and it is fundamental to keep a cryptographic key secret and secure it from loss, theft or corruption, etc. At the same time, it is also required to be able to access such keys quickly and easily whenever needed.

In one existing solution, a software application is employed for storage and management of cryptographic key(s). This solution may fulfil the accessibility requirement mentioned above, e.g., the cryptographic key is accessible through the software application on-demand. However, it is not an ideal solution for secure storage of the cryptographic key(s) due to software bugs which inevitably exist in the software application, weaknesses or vulnerabilities in the hardware or communication network where the software application is executed, and/or the risk of malicious software attacks.

In another existing solution, a hardware device is employed to store cryptographic key(s). This solution may provide secure storage of the cryptographic key since various security features may be used in the hardware device to protect the cryptographic key from unauthorized access. However, this solution does not offer on-demand access to the cryptographic key since the hardware device must be secured and provisioned by the owner whenever access thereto is required, e.g., the hardware device may be taken out by the owner from another secure storage, like a safe box or a bank vault, and plugged into a host device, e.g., a computer. Further, although the design of the hardware device may employ a plurality of security features, if the hardware device is stolen or becomes physically accessible by an attacker, a direct attack on the hardware, e.g., side-channel attacks, probing, and so on, cannot be prevented.

In view of the above, the existing solutions for storage and management of cryptographic key cannot effectively address the security and accessibility issues at the same time, i.e. the existing solutions may either achieve secure storage with poor accessibility, or vice versa. The same issues also exist for storage and management of other confidential information/data, e.g., confidential documents, passwords, etc.

SUMMARY OF INVENTION

Embodiments of the invention provide a solution for storage and management of confidential information, e.g., cryptographic key, confidential document, and/or password, etc., which can provide secure storage and ready access to the confidential information simultaneously.

According to one aspect of the invention, a system for storage and management of confidential information is provided. The system comprises:

at least one electronic device, wherein each electronic device is configured to store confidential information, and execute a service request using the confidential information stored therein;

a control system configured to provide power supply to any one of the at least one electronic device, which is connected to the control system, and communicate a service request from a specific user to an electronic device in connected state which is associated with the specific user; and an enclosure configured to house the at least one electronic device, and the control system.

According to a second aspect of the invention, a method for confidential information management is provided. The method comprises:

providing, by a control system, power supply to an electronic device which is connected to the control system and associated with a specific user;

transferring, by the control system, a service request from the specific user to the electronic device; and executing, by the electronic device, the received service request using confidential information stored therein.

According to a third aspect of the invention, a method for storage and management of confidential information is provided. The method comprises:

assigning an electronic device to a specific user to store confidential information and execute a service request using the confidential information stored therein;

using a control system to provide power supply to the electronic device and communicate the service request from the specific user to the electronic device; and using an enclosure to house the electronic device and the control system.

BRIEF DESCRIPTION OF THE DRAWINGS

The invention will be described in detail with reference to the accompanying drawings, in which:

FIG. 2b is a schematic diagram showing an example of the electronic device in FIG. 2a;

DETAILED DESCRIPTION OF EMBODIMENTS OF THE INVENTION

Figure 1A:
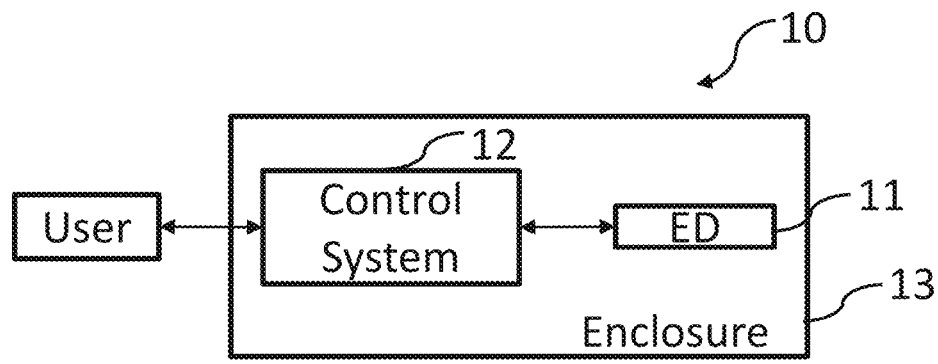
FIGS. 1a and 1b are schematic diagrams illustrating various systems for storage and management of confidential information according to some embodiments of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements.

As used herein, the term "and/or" includes any and all combinations of one or more of the associated listed items.

As used herein, the terms "first," "second," and "third," etc. are used merely as labels, and are not intended to impose numerical requirements on their objects.

As used herein, the term "configured to" is interchangeable with "operative" or "adapted to".

As used therein, the term "coupled" and related terms are used in an operational sense and are not necessarily limited to a direct physical connection or coupling. Thus, for example, two devices may be coupled directly, or via one or more intermediary devices. In certain examples, devices may be suitably coupled such that information or signal can be passed there between, while not sharing any physical connection with each other. For example, two devices may be communicably coupled via a wired or wireless connection. Based on the present disclosure, a person of ordinary skill in the art will appreciate a variety of ways in which coupling exists in accordance with the aforementioned definition.

Embodiments of the invention provide a solution for storage and management of confidential information, e.g., cryptographic keys, confidential documents or passwords, etc. In this solution, an electronic device is assigned to a specific user to store confidential information and execute a service request using the confidential information store therein, and a control system is provided to control power supply to the electronic device and communication between the specific user and the associated electronic device. With this solution, both security and on-demand accessibility of the confidential information can be fulfilled at the same time.

Figure 1B:
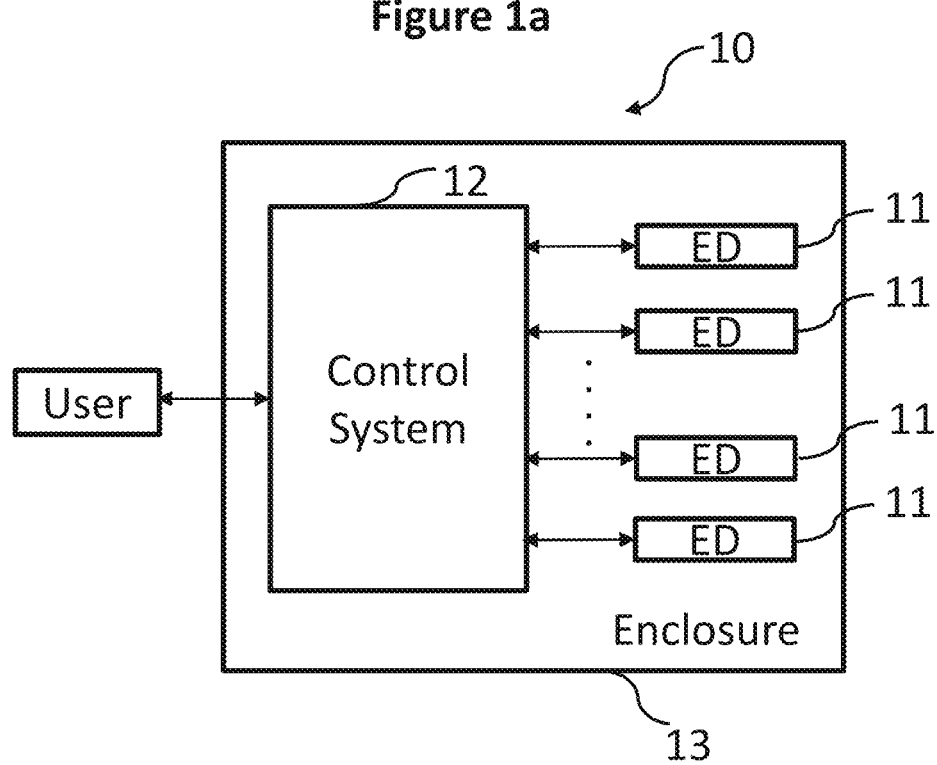

FIGS. 1a and 1b are schematic diagrams illustrating various system 10 for storage and management of confidential information according to some embodiments of the invention. The system 10 includes at least one electronic device 11, a control system 12 and an enclosure 13 to house the at least one electronic device 11 and the control system 12. FIG. 1a shows an example of the system 10 which includes only one electronic device 11 and FIG. 1b shows another example of the system 10 which includes a plurality of electronic devices 11.

Electronic Device

Each electronic device 11 in the system 10 is configured to store confidential information and execute a service request using the stored confidential information. When any one of the at least one electronic device 11 is in use, it is assigned to a specific user to store confidential information associated with the specific user and execute a service request from the specific user.

In some embodiments, the confidential information may include one or more cryptographic keys.

In some embodiments, the service request may include a request for provision of the confidential information, e.g., cryptographic key, or a request for using the confidential information, e.g., cryptographic key, to carry out any computational process or transaction. Accordingly, each electronic device 11 may be configured to provide the stored confidential information or carry out any computational process or transaction using the confidential information in response to a received service request.

In some embodiments, the electronic device 11 may be a USB drive or dongle, a custom flash memory drive, a third-party hardware wallet or any other type of electronic device which can be used to store confidential information and execute a service request using the confidential information.

Figure 2A:
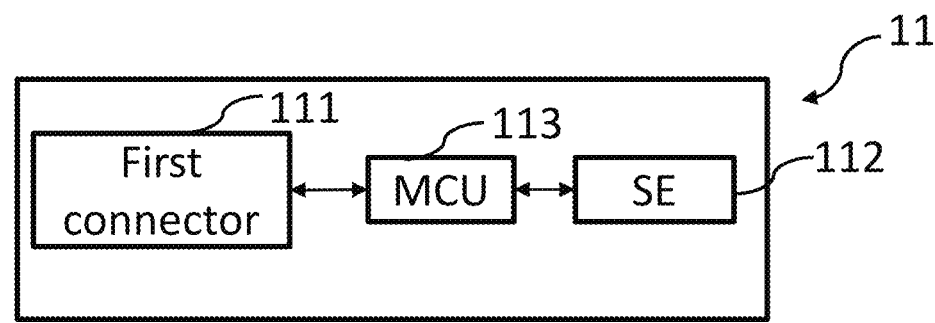
FIG. 2a is a schematic diagram illustrating an electronic device (spark device) according to one embodiment of the invention.

FIG. 2a is a schematic diagram illustrating an electronic device 11 (which may additionally and/or alternatively be referred to as a spark device) according to one embodiment of the invention. As shown in FIG. 2a, the electronic device 11 includes a first connector 111, a secure element (SE) 112 and a microcontroller unit (MCU) 113.

The first connector 111 is configured to engage with the control system 12 (not shown in FIG. 2a); the SE 112 is configured to store the confidential information; and the MCU 113 is configured to execute a service request using the confidential information stored in the SE 112. The SE 112 may be a microchip with special security features, such as tamper proof packaging, anti-probing measures through an electronic microscope, and so on.

Figure 2B:
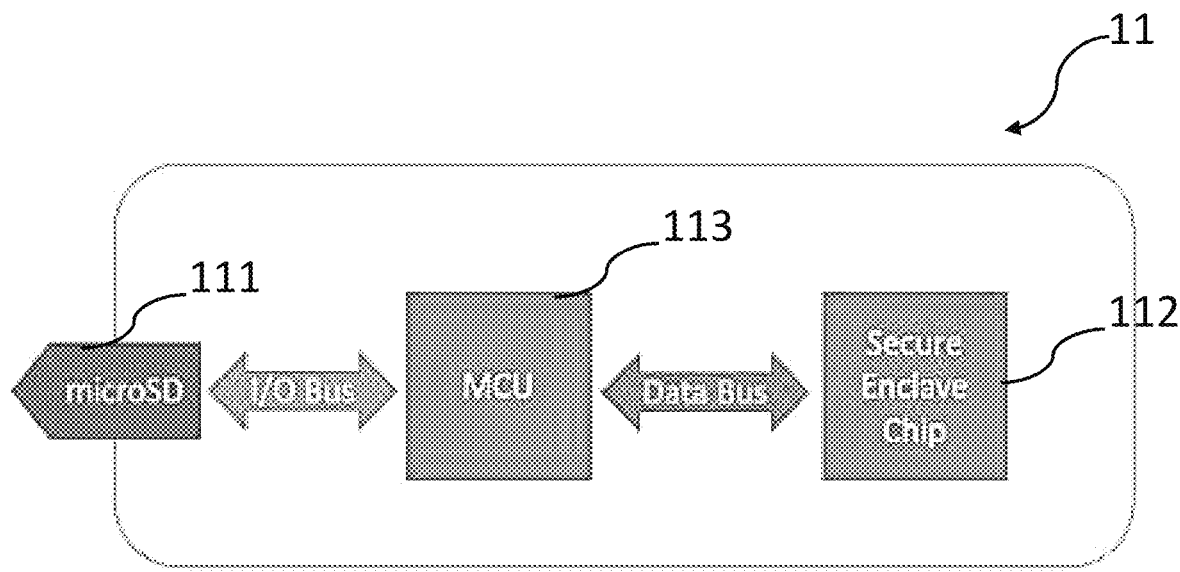

FIG. 2b is a schematic diagram showing an example of the electronic device 11 in FIG. 2a. In this example, the first connector 111 is a male microSD connector which is configured to engage with the control system 12; the SE 112 is a secure enclave chip and the MCU 113 is programmed with firmware software to execute certain service requests. The service requests may be communicated through a messaging Application Programming Interface (API).

It is to be appreciated by a person skilled in the art that this example is not intended to limit the scope of the invention. Specifically, the first connector 111 may be any type of connector as long as it is suitable for engaging with the control system 12; and the SE 112 may be any type of chip as long as it can provide secure storage of the confidential information.

In some examples, the MCU 113 of any electronic device 11 may be further configured to perform one or more than one of the following service requests:
1. Authenticate the service request received from the control system by verifying a digital signature included in the service request.
2. Generate and store at least one cryptographic key pair for a specific user associated with the electronic device using SE.
3. Sign a blockchain transaction using the stored cryptographic key.
4. Generate a tree of cryptographic key pairs from a seed key stored in the electronic device.
5. Receive a third party's digital signature from the associated specific user to authorize the third party to make a service request to the electronic device; and execute the service request from the third party. For example, if a specific user wants to authorize a utility company to send a service request to have the associated electronic device sign a blockchain transaction so that the utility company can charge a number of Bitcoins from the specific user's wallet to pay an utility bill, the specific user may send a service request including a digital signature of the utility company to the associated electronic device to authorize the utility company. Then, the utility company would be allowed to send a service request to the associated electronic device to sign a blockchain transaction that transfers Bitcoins from the specific user's wallet to the utility company's wallet to pay the utility bill.

It is to be appreciated by a person skilled in the art that the examples of the electronic device 11 mentioned above are not intended to limit the scope of the invention. Any type of electronic device may be used in this invention as long as it can realize the functions of the electronic device 11 mentioned above.

Control System

The control system 12 is configured to provide power supply to any one of the at least one electronic device 11, which is connected to the control system 12, e.g., in connected state, and communicate a service request from a specific user to an electronic device 11 which is in connected state and associated with the specific user.

In some embodiments, the service request from the specific user may be transferred to the control system 12 through a communication platform. The communication platform may include any computing system connected to the control system 12, e.g., a local computing system or a cloud-hosted computing system on which software for executing the method(s) proposed by embodiments of the invention is hosted. The specific user may be connected to the computing system through wide area network (WAN) or internet.

In some embodiments, to further improve security of the system 10, the control system 12 may be further configured to power up any one of the at least one connected electronic device 11 in response to a power regulation request, which is from an associated specific user, to power up the electronic device 11. This way, the electronic device 11 in connected state is only powered up when a power regulation request is received from an associated specific user so that the accessible time of the electronic device 11 through network is shortened or restricted. Thus, the possibility of attacking the electronic device 11 and obtaining the confidential information stored therein will be greatly reduced.

Similar to the above, in some embodiments, to further improve security of the system 10, the control system 12 may be further configured to power down any one of the at least one connected electronic device 11 in response to a power regulation request, which is from an associated specific user, to power down the electronic device 11. This way, the electronic device 11 in connected state is powered down once a relevant request is received from an associated specific user so that the accessible time of the electronic device 11 through network is shortened or restricted. Thus, the possibility of attacking the electronic device and obtaining the information stored therein will be greatly reduced.

In some embodiments, the control system 12 may be further configured to communicate an output of the service request from any electronic device 11 in connected state to the associated specific user, or communicate the output to a communication platform which is configured to broadcast the output to one or more than one predetermined address. For example, if the electronic device 11 receives a service request for signing a blockchain transaction, then once the electronic device 11 has signed the blockchain transaction, the control system 12 may communicate the result of the blockchain transaction from the electronic device 11 to the associated specific user, or the control system 12 may communicate the result of the blockchain transaction to a communication platform which is configured to broadcast the result to a blockchain network.

In some embodiments, the control system 12 includes at least one sub-control system and each sub-control system includes at least one second connector, a power bus and a data bus. If the system 10 includes one electronic device 11, the control system 12 includes one sub-control system 12a and the sub-control system 12a includes one second connector 121.

Figure 3:
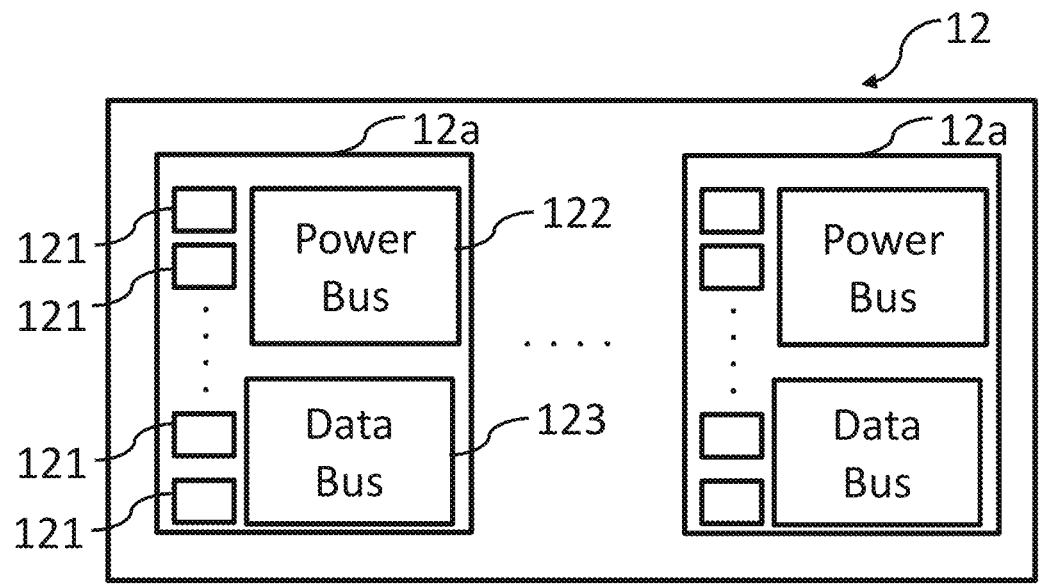
FIG. 3 is a schematic diagram illustrating the structure of a control system according to one embodiment of the invention.

FIG. 3 is a schematic diagram illustrating the structure of the control system 12 according to one embodiment of the invention. In this embodiment, the control system 12 is an electronic system made up of custom electronics and custom firmware, which includes a plurality of sub-control systems (which may additionally and/or alternatively be referred to as a MegaBus) 12a and each sub-control system 12a includes a plurality of second connectors 121, a power bus 122, and a data bus 123. The power bus 122 and the data bus 123 may be completely separated from each other and they may be controlled independently through a communication interface, e.g., an Ethernet interface.

Integration of the Electronic Device and the Control System

Each second connector 121 of the control system 12 is configured to engage with the first connector 111 of an electronic device 11 to connect the electronic device 11 to the power bus 122 and the data bus 123.

In one example, each second connector 121 may be a female microSD connector, which is configured to engage with the male microSD connector of an electronic device 11.

Figure 4:
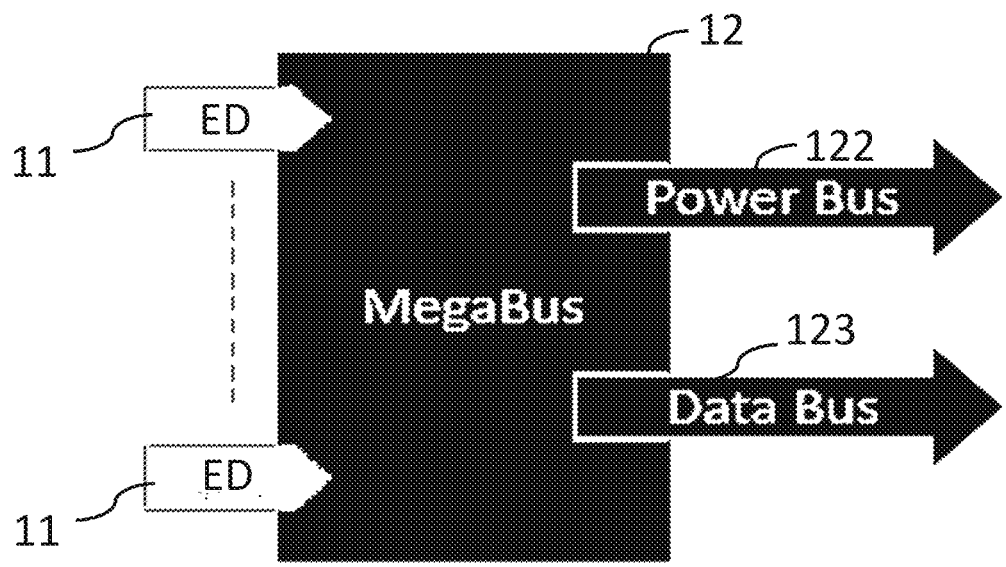
FIG. 4 is a schematic diagram illustrating an integration of electronic devices and the control system according to one embodiment of the invention.

FIG. 4 is a schematic diagram illustrating the integration of the electronic devices 11 and the control system 12 according to one embodiment of the invention. In this embodiment, each electronic device 11 includes a male microSD connector fabricated on/integrated to a printed circuit board (PCB) of the electronic device 11; and the control system 12 includes one sub-control system 12a, e.g., the MegaBus as shown in FIG. 4, which includes a plurality of female microSD connectors on its PCB. Each electronic device 11 is pushed into a female microSD connector and held in place by it to attain connected state, since the microSD connectors are push/push type connectors.

Power Bus and Power Bus Integration

The power bus 122 of each sub-control system 12a includes a central control unit (CCU) which is configured to regulate power supply to any electronic device 11 in connected state in response to a power regulation request received from a specific user associated with the electronic device 11.

In some embodiments, the CCU may include a System-on-a-Chip (SOC) equipped with a central processing unit (CPU), memory and Ethernet interface. The software on the CCU is configured to regulate power supply to any electronic device 11 in connected state.

In some embodiments, the regulation of power supply may include providing power supply to any electronic device 11 in connected state. In some other embodiments, to further improve security of the system 10, the regulation of power supply may further include powering up/powering down an electronic device 11 associated with the specific user depending on a power regulation request from an associated specific user.

In embodiments where the system 10 includes a plurality of electronic devices, the power bus 122 of each sub-control system 12a may further include a plurality of slave MCUs, and a plurality of electronic power switches (EPSs), wherein each slave MCU is communicably coupled between the CCU of the power bus 122 and a subset of the plurality of EPSs, and each EPS is associated with an electronic device 11, wherein the CCU is further configured to transfer a power regulation request from a specific user to a corresponding slave MCU to activate/deactivate a corresponding EPS, thereby powering up/powering down an electronic device 11 associated with the specific user.

Figure 5:
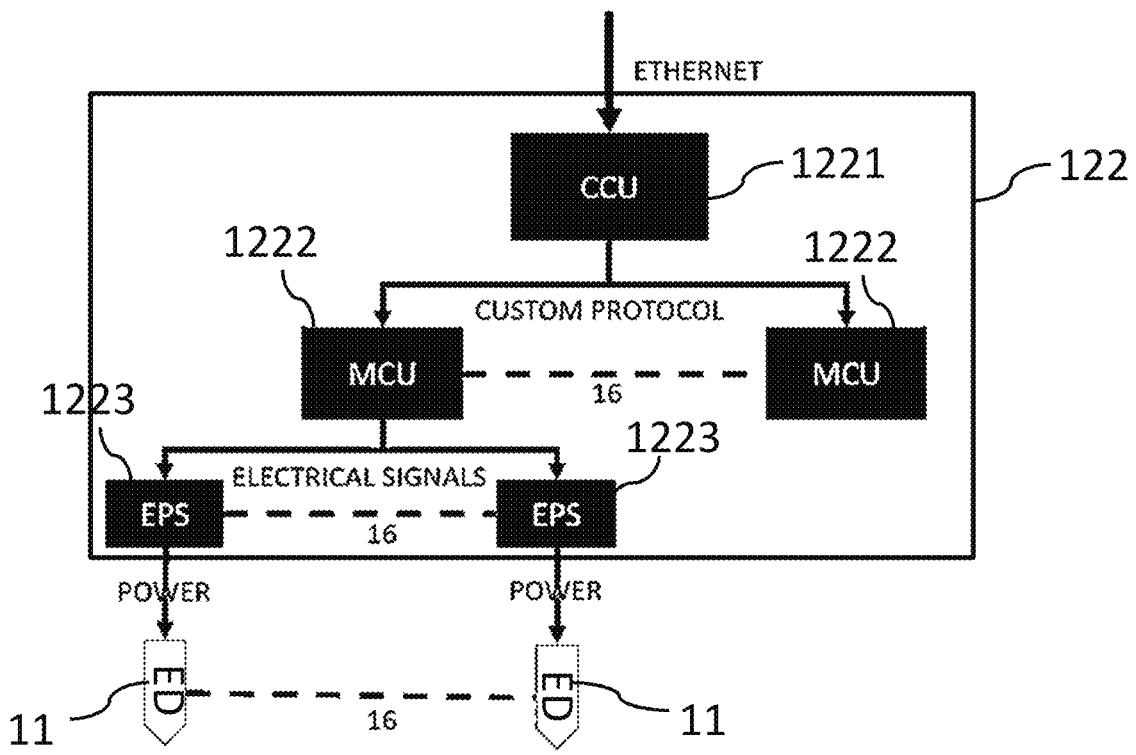
FIG. 5 is a schematic diagram illustrating a configuration of a power bus according to one embodiment of the invention.

FIG. 5 is a schematic diagram illustrating the configuration of the power bus 122 according to one embodiment of the invention. As shown in FIG. 5, the power bus 122 includes a CCU 1221, 16 MCUs 1222 and 256 EPSs 1223. Each MCU 1222 is communicably coupled between the CCU 1211 and 16 EPSs 1223. Each EPS 1223 is associated with one electronic device (e.g., spark device) 11.

Data Bus and Data Bus Integration

The data bus 123 includes a CCU which is configured to transfer a service request received from a specific user to an associated electronic device 11 in connected state.

In some embodiments, the CCU 1231 may be made up of a System-on-a-Chip (SOC), equipped with a CPU, memory, and Ethernet interface. The software on the CCU is configured to receive the service request from a specific user through the Ethernet interface, and transfer the service request to an associated electronic device 11.

In embodiments where the system 10 includes a plurality of electronic devices, the data bus 123 may further include a plurality of Universal Asynchronous Receiver/Transmitter interfaces (UARTs), wherein each UART is communicably coupled between the CCU of the data bus 123 and a subset of the plurality of electronic devices 11, wherein the CCU is further configured to transfer a service request from a specific user to an associated electronic device 11 through a corresponding UART.

Figure 6:
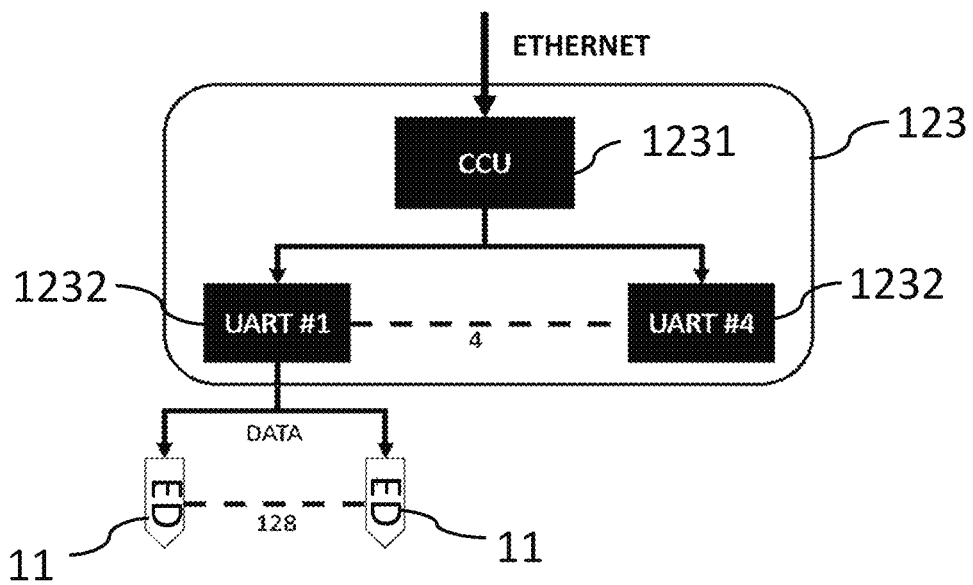
FIG. 6 is a schematic diagram illustrating a configuration of a data bus according to one embodiment of the invention.

FIG. 6 is a schematic diagram illustrating the configuration of the data bus 123 according to one embodiment of the invention. As shown in FIG. 6, the data bus 123 includes a CCU 1231 and four UART 1232, i.e. UART #1, UART #2, UART #3 and UART #4. Each UART 1232 is communicably coupled between the CCU 1231 and 128 electronic devices 11.

In this embodiment, the CCU 1231 therefore is configured to control all of the 512 electronic devices 11 through four UARTs 1232. Accordingly, when a service request from a specific user is transferred through the Ethernet interface, the CCU 1231 is configured to route the service request to an associated electronic device 11 through a corresponding UART 1232 based on the destination address of the electronic device 11. Each electronic devices 11 may be configured to listen to the data bus 123 all the time or at predetermined intervals, and acknowledge receipt of a service request with its own address and execute the service request, while the CCU 1231 may be further configured to poll any electronic device 11 in connected state for a response, e.g., request a response from any electronic device 11 to check status of the electronic device 11, or check whether a response to a service request is ready, and so on.

It is to be appreciated by a person skilled in the art that the number of electronic devices, MCUs, EPSs, and UARTs in the system is not intended to limit the scope of the invention. In other embodiments of the invention, the number of the different devices/components may vary depending on the need of actual application.

Data and Power Integration

Figure 7:
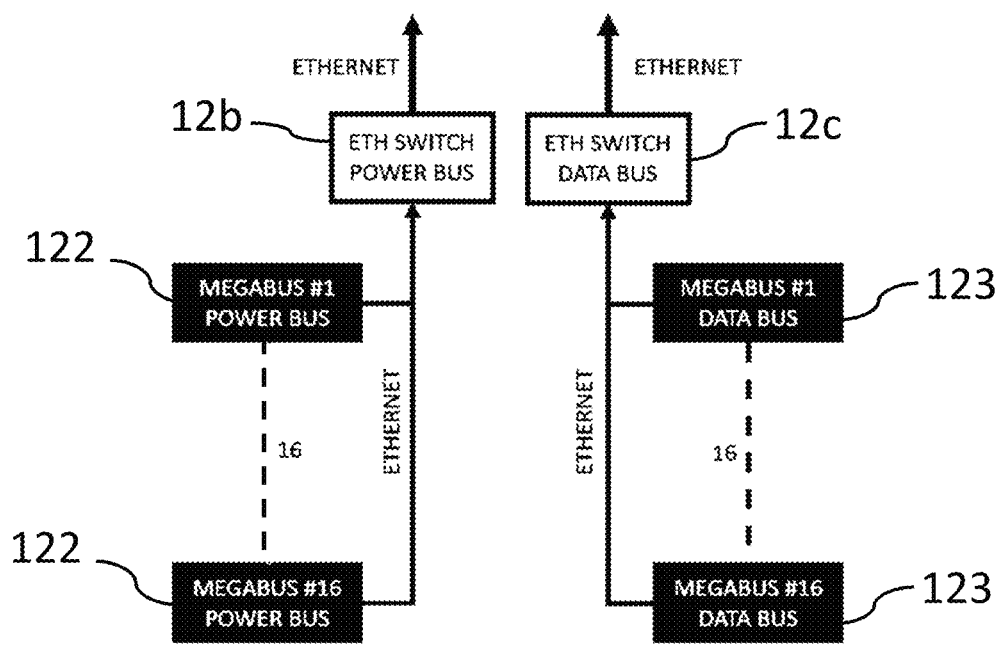
FIG. 7 is a schematic diagram illustrating a grouping arrangement of power bus and data bus Ethernet interfaces according to one embodiment of the invention.

In some embodiments where the control system 12 includes a plurality of sub-control systems 12a, the control system may further include at least one power bus Ethernet switch and at least one data bus Ethernet switch, wherein each power bus Ethernet switch is connected to power buses of a subset of the sub-control systems; and wherein each data bus Ethernet switch is connected to data buses of a subset of the sub-control systems. FIG. 7 is a schematic diagram illustrating possible grouping arrangement of power bus and data bus Ethernet interfaces according to one embodiment of the invention. As shown in FIG. 7, in this embodiment, the control system 12 includes 16 sub-control system 12a (MEGABUS #1 to MEGABUS #16), the power bus 122 of each sub-control system 12a is connected to a power bus Ethernet switch 12b; and the data bus 123 of each sub-control system 12a is connected to a data bus Ethernet switch 12c.

It is to be appreciated by a person skilled in the art that the control system 12 shown in FIG. 3 is only for illustration purpose, not intended to limit the scope of the invention. In some embodiments, the control system 12 may include a common communication bus using a networking technology, e.g., Ethernet technology, or USB technology, or I2C technology.

Enclosure

The enclosure 13 is provided to house the at least one electronic device 11 and the control system 12 so as to prevent unauthorized access thereto and provide increased protection to the at least one electronic device 11 and the control system 12 from damage due to exposure to external environment, e.g., to protect the at least one electronic device 11 and the control system 12 from external damaging agents, e.g., flood, earth quake, fire, electromagnetic radiation (EMD), etc.

In some embodiments, the enclosure 13 may be configured to house a power distribution network comprising several Power Supply Units (PSUs) that deliver power supply to the control system 12, and a data distribution network comprising several Ethernet switches to provide communication connection to each sub-control system 12a.

In some embodiments, the enclosure 13 may include a rigid material e.g., steel, other metal, or polymethyl methacrylate, etc.

In some embodiments, the enclosure 13 may include a base, a roof and an outer wall disposed between the roof and the base.

In some embodiments, the outer wall may include an opening to allow an operator access any parts of the system hosted in the enclosure 13 for checking, maintenance or repair. The opening may extend from the top to the bottom of the outer wall. A removable cover, e.g., a panel, may be provided to allow or disallow access through the opening.

In some embodiments, the outer wall may include two parts, which are hingedly coupled to each other on one side and detachably securable to each other on the other side. In one example, the two parts of the outer wall may be two semi-cylindrical shields of rigid material.

In some embodiments, the enclosure 13 may include a metal cage to surround the components of the system 10 hosted inside, e.g., the at least one electronic device 11 and the control system 12. The metal cage may function as a Faraday cage to protect the electronics inside from electromagnetic interference (EMI)/radio frequency interference (RFI) and Tempest attacks.

In some embodiments, the enclosure 13 may further include an internal frame on which the control system 12 is mounted. In some embodiments, the internal frame may include a plurality of central and lateral columns connecting between the roof and the base. In some embodiments, the internal frame may include a left part, a right part and a fixed column. The fixed column may be a perimetral column. Both the left part and the right part are hingedly coupled to the fixed column to permit the internal frame to be opened to carry out maintenance. In some embodiments, the internal frame may be rotatable to align parts thereof with an opening on the outer wall to allow access to any part of the internal frame.

Figure 8A:
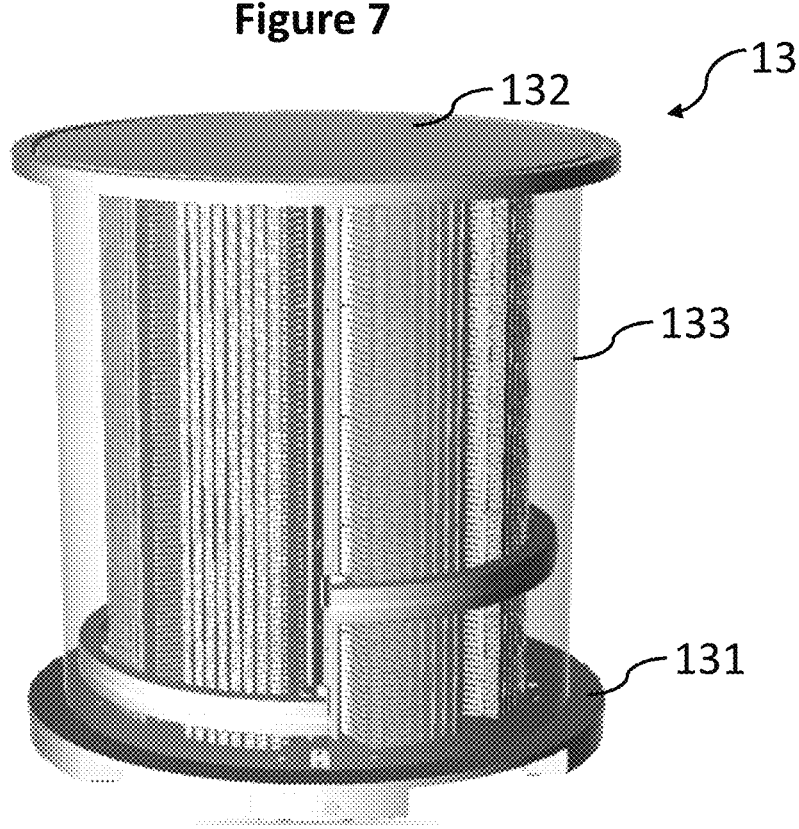
FIG. 8a and FIG. 8b show external view and internal view of an enclosure respectively according to one embodiment of the invention.
Figure 8B:
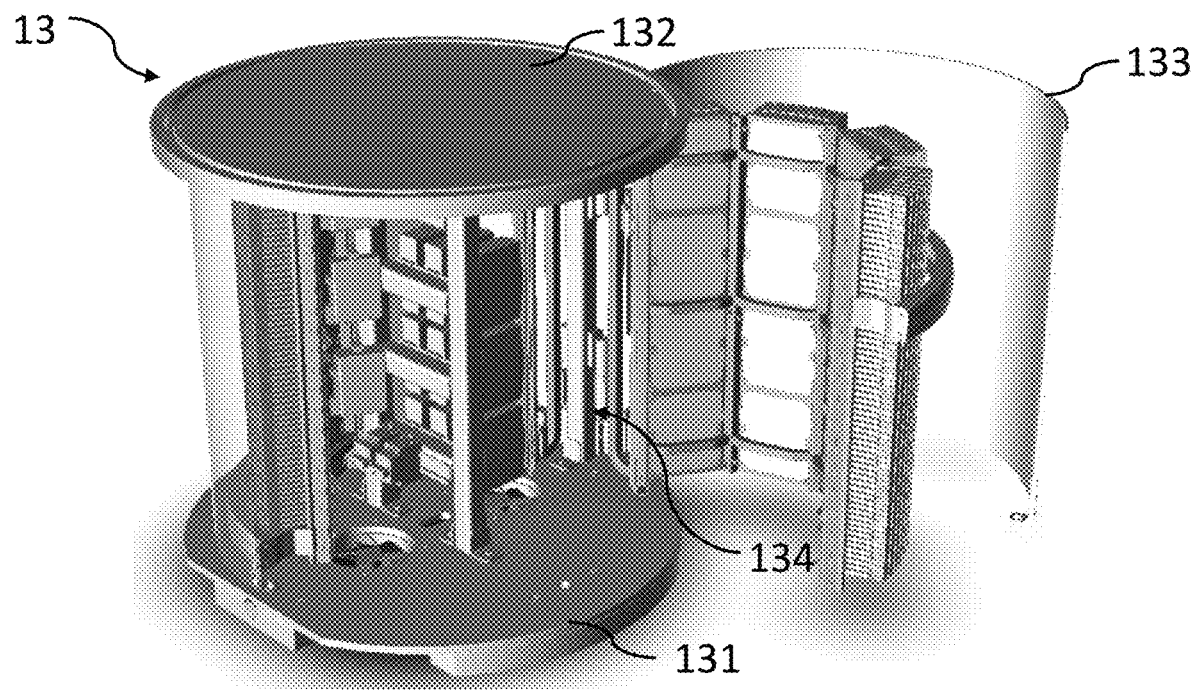

FIG. 8a and FIG. 8b show external view and internal view of an enclosure 13 respectively according to one embodiment of the invention. In this embodiment, the enclosure 13 includes a bottom base 131, a top or roof 132, an outer wall 133 and an internal frame 134. As shown in FIGS. 8a and 8b, the outer wall 133 is connected between the bottom base 131 and the roof 132 by securing means, e.g., screws. In this embodiment, the bottom base 131, roof 132, and the internal frame 134 are made of metal, e.g., steel, and the outer wall 133 includes transparent rigid material so that the internal state of the system can be checked without opening the enclosure 13.

As shown in FIG. 8b, the internal frame 134 includes a plurality of central and lateral metal columns so that the control system 12 can be mounted thereon. To permit opening of the internal frame 134 of the enclosure 13 to carry out maintenance, the internal frame 134 is designed to include a left part, a right part and a fixed perimetral column. Both of the left and right parts are hingedly coupled to the fixed perimetral column.

Figure 8C:
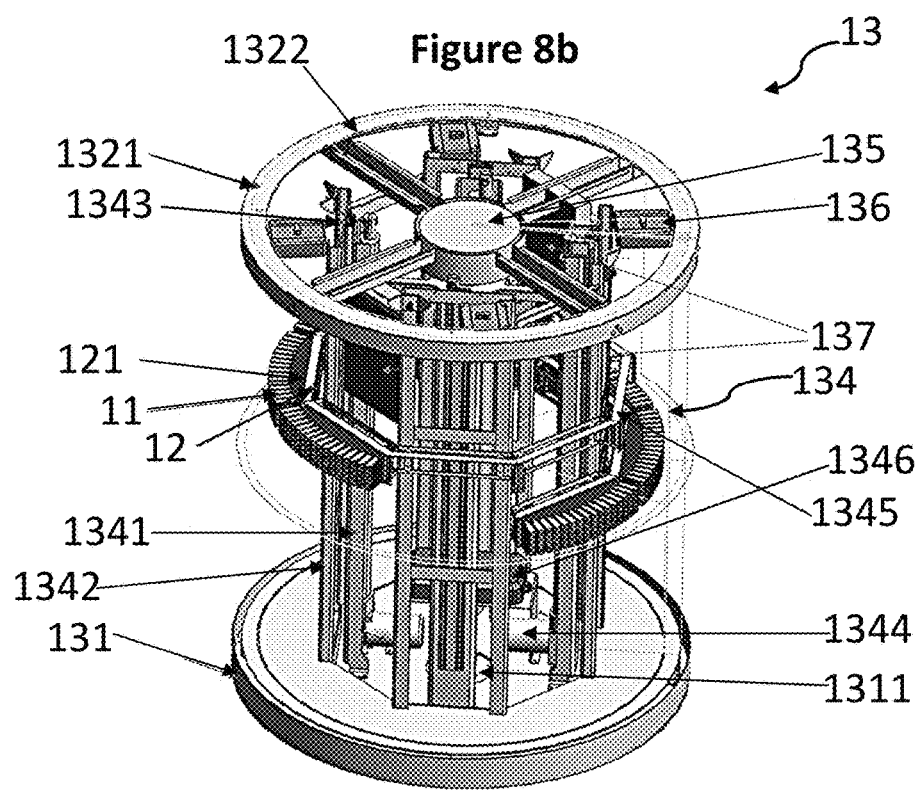
FIG. 8c shows a perspective view of the enclosure without a roof and an outer wall according to one embodiment of the invention.

FIG. 8c shows a perspective view of an enclosure 13 without the roof and the outer wall according to one embodiment of the invention. In this embodiment, the enclosure 13 includes a bottom base 131, a roof, an outer wall (not shown in FIG. 8c) and an internal frame 134 connecting between the roof and the bottom base 131.

As shown in FIG. 8c, the internal frame 134 includes an inner cage 1341, an outer cage 1342, a plurality of railings 1343 for movably coupling the outer rage 1341 to the inner rage 1342, four linear actuators 1344, a PCB frame 1345, and a linear actuator control module 1346.

Referring to FIG. 8c, the roof is disposed on a fixed outer ring 1321 and an inner circle 1322. The inner circle 1322 sits on top of the outer cage 1341, which is raised up by the liner actuators 1344.

The bottom base 131 may include a central power cables inlet 1311 to allow power cables to enter into the enclosure 13. To prevent easy removal of the enclosure 13 and protect the system from damage, e.g., damage due to earthquakes, the bottom base 131 is made of a single piece of heavy metal, and further includes a flange to secure it to the floor using bolts or other fixing means. The bottom base 131 may have holes to allow a pallet jack to lift it so that it can be disposed at a predetermined location.

The inner cage 1341 is fixed to the bottom base 131 to provide central support over which the outer cage 1342 is allowed to move.

A plurality of railings 1343 are used to connect the outer cage 1342 to the inner cage 1341 so that the outer cage 1342 can be raised and slide over the inner cage 1341. The outer cage 1342 is slidably mounted on top over the railings 1343, so that it can be raised.

Each linear actuator 1344 is attached to the bottom base 131 and to the inner cage 1341. The linear actuator's moving rod is attached to the inner cage 1341 at its top. When the linear actuator 1344 is raised, the outer cage 1342 is also raised, until the outer cage 1342 is fully exposed at the top of the enclosure 13. The linear actuators 1344 are used to allow maintenance of the system inside the enclosure 13, e.g., installation, replace, repair and/or removal of electronic devices inside or parts of the internal frame, e.g., frame segments 1345.

The linear actuator control module 1346 is configured to synchronize the movement of the linear actuators 1344.

The PCB frame 1345 is mounted on top of the outer cage 1342 by any suitable means, e.g., screws. This allows maintenance of the electronic devices 11 by exposing them over the main internal frame 134. As shown in FIG. 8C, the PCB frame 1345 is configured to host backplane PCBs of the control system 12. The backplane PCBs of the control system 12 are attached to the PCB frame 1345 by any suitable means, e.g., screws. Each sector PCB 121 which is used for hosting the electronic devices 11 connects to a backplane PCB using a board-to-board connector. The maximum number of backplane PCBs of the control system 12 which can be hosted by the PCB frame 1345 may depend on the size of outer cage 1342.

In one example, the PCB frame 1345 may include a plurality of half group frames. Each half group frame is a metal framework with the shape of a half-octagon. There are 4 backplanes PCBs attached to each half group frame. Each backplane PCB is connected to a power cable and data cable. Of the 4 backplane PCBs in each half group frame, 2 are active backplane PCB and 2 are passive backplane PCB. The active backplane PCB host a SOM Board on top of them (System-on-Module). Each backplane PCB is configured to host eight sectors PCBs 121 and each sector PCB 121 has 16× microSD female connectors where the electronic devices 11 are plugged into. Each electronic device 11 has a male microSD connector which is configured to be plugged into a female microSD connector on the sector PCB 121.

The enclosure 13 may further include a centrifugal cooling fan 135. This fan is configured to draw air from the column below and expel the drawn air through the side of cooling fan 135 to exit from the outer ring of the roof.

The enclosure 13 may further include electromechanical locks 136. The electromechanical locks secure the roof's inner circle to the roof's outer ring to prevent access to inside of the enclosure.

The enclosure 13 may further host a plurality of Ethernet routers 137. Each active backplane connects to an Ethernet router with a CAT5 cable.

It is to be appreciated by a person skilled in the art that the above examples of the enclosure are provided for illustration purpose only; these are not intended to limit the scope of the invention. Any type of enclosure may be used in this invention as long as it can prevent unauthorized access to the system and provide at least some level of increased protection to the at least one electronic device and the control system from damage due to exposure to external environment.

Connection Actuator

To further improve security of the confidential information stored in the electronic devices and allow easier access to the electronic devices, a system 20 is provided for storage and management of confidential information. Compared to the system 10, the system 20 may include the elements of system 10 and further include a connection actuator.

Figure 9:
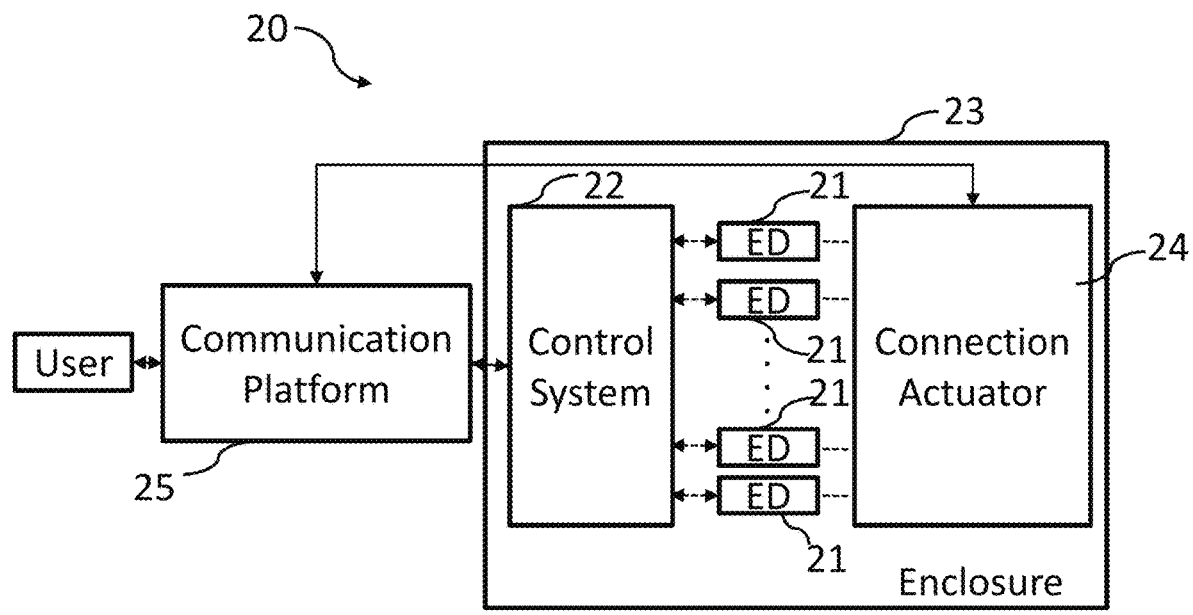
FIG. 9 is a schematic diagram illustrating a system for storage and management of confidential information according to some embodiments of the invention.

FIG. 9 is a schematic diagram illustrating the structure of the system 20 for storage and management of confidential information according to some embodiments of the invention. Referring to FIG. 9, the system 20 may include at least one electronic device 21, a control system 22, an enclosure 23 and a connection actuator 24. Each electronic device 21 is similar to the electronic device 11, and the control system 22 is similar to the control system 12. The details of the electronic device 21 and the control system 22 will not be described again here. The enclosure 23 is similar to the enclosure 13, but it is further configured to house the connection actuator 24 to protect it from unauthorized access and from damage due to exposure to external environment at least to certain extent.

The connection actuator 24 is configured to connect any one of the at least one electronic device 21, which is associated with a specific user, to the control system 22 to attain connected state in response to a connect request from the specific user and further configured to disconnect the electronic device 21 from the control system 22 to attain disconnected state in response to a disconnect request from the specific user.

Figure 10A:
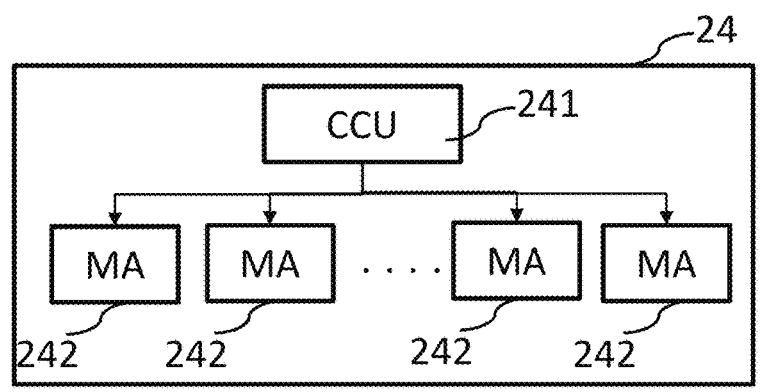
FIG. 10a is a schematic diagram showing a connection actuator according to some embodiments of the invention.

FIG. 10a is a schematic diagram showing a connection actuator 24 according to some embodiments of the invention. Referring to FIG. 10a, the connection actuator 24 may include a CCU 241 and at least one mechanical actuator (MA) 242. The CCU 241 is configured to receive a connect request or a disconnect request from a specific user, and control one of the at least one mechanical actuator 242 to actuate an electronic device 21 associated with the specific user so as to toggle the electronic device 21 from the connected state to the disconnected state or vice versa.

In some embodiments, the connection actuator 24 may further include a positioning unit (PU), and the CCU 241 is further configured to control the positioning unit to dispose the one of the at least one mechanical actuator 242 in a predetermined spatial relationship with the electronic device 21 associated with the specific user.

In some embodiments, the positioning unit may include a main body movably coupled to a plurality of fixed guide rails, and a motor. The at least one mechanical actuator 242 is mounted on the main body. The motor is configured to control movement of the main body along the guide rails. The fixed guide rails may be part of the internal frame of the enclosure 23. In one embodiment, the fixed guide rails may be linear guide rails.

In some embodiments, the positioning unit may include a main body movably coupled to a plurality of fixed guide rails, a carriage movably mounted on a track on the main body, wherein the at least one mechanical actuator 242 is mounted on the carriage, and at least one motor configured to control movement of the main body along the guide rails, and movement of the carriage along the track. The fixed linear guide rails may be part of the internal frame of the enclosure 23. In one embodiment, the fixed guide rails may be linear guide rails.

Figure 10B:
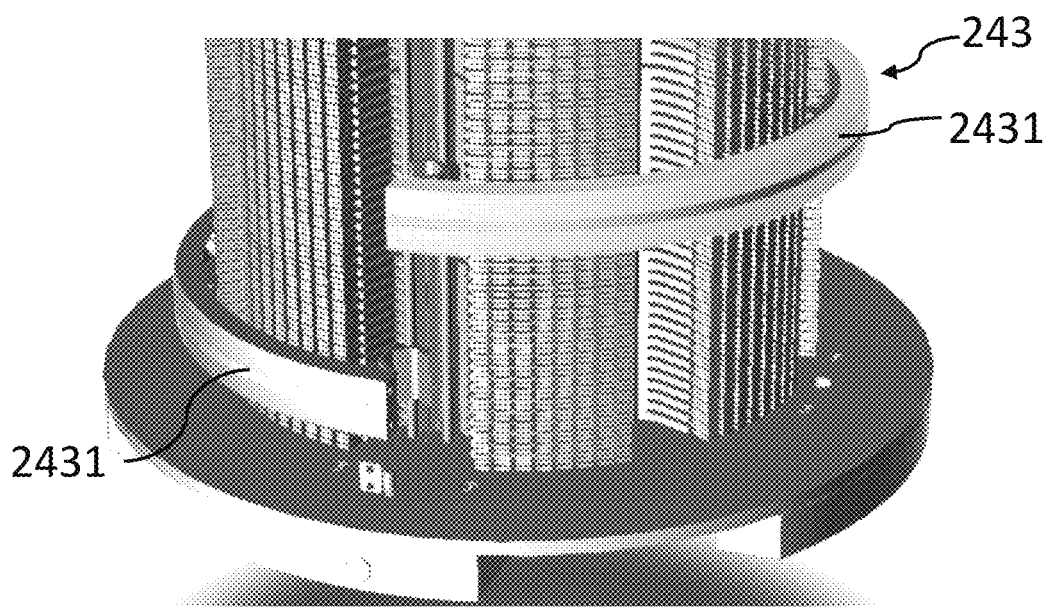
FIG. 10b and FIG. 10c show various views of a connection actuator according to one embodiment of the invention.
Figure 10C:
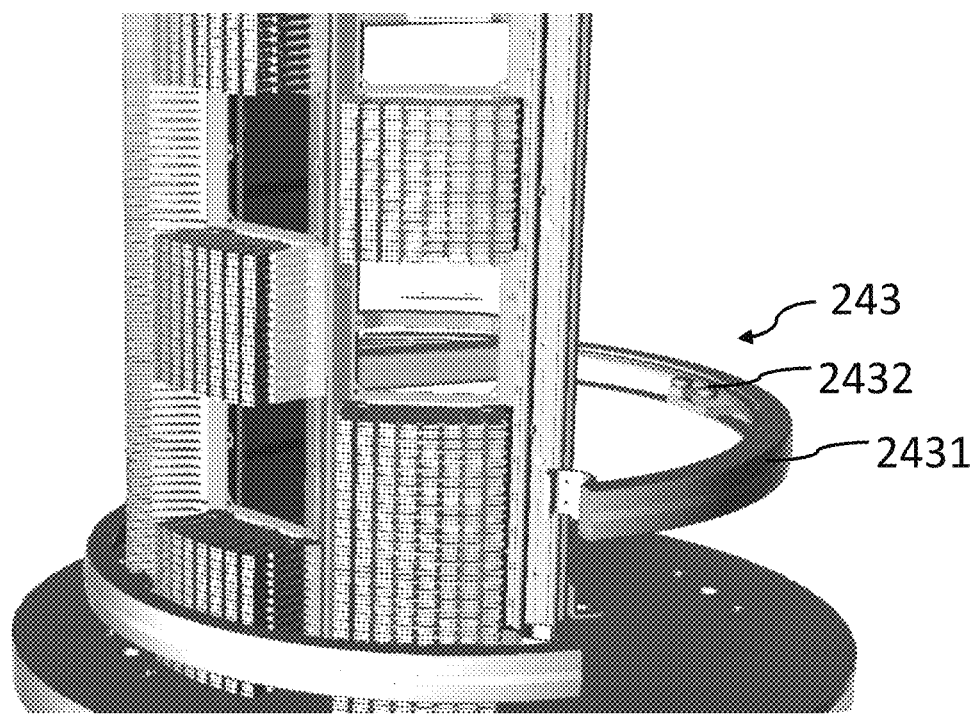

FIG. 10b and FIG. 10c show a connection actuator 24 according to one embodiment of the invention. In this embodiment, push/push type microSD connectors are used on the electronic device 21 and the control system 22, which allow to connect the electronic device 21 to the control system 22 by pushing the electronic device 21 to engage the male microSD connector with the female microSD connector, and to disconnect the electronic device 21 from the control system 22 by pushing the electronic device 21 again to disengage/release the male microSD connector from the female microSD connector.

The connection actuator 24 is a robotic ring which includes a CCU 241 (not shown in the FIGS. 10b and 10c), two mechanical actuators 242 (not show in the Figures), and a positioning unit 243.

The positioning unit 243 includes a main body 2431, two carriages 2432 and four motors (not shown in the Figures). As shown in FIG. 10b, the main body 2431 includes two ring segments, and each ring segment is movably coupled to two fixed vertical linear guide rails and positioned around the core of the enclosure 23. Referring to FIG. 10c, each carriage 2432 is movably mounted on the track on a corresponding ring segment 2431. The two mechanical actuators 242 are mounted on the two carriages 2432 respectively.

In this embodiment, the CCU 241 comprises a System-on-a-Chip equipped with a CPU, memory, and an Ethernet interface. The software on the CCU 241 is configured to receive a connect request or a disconnect request from a specific user through the Ethernet interface and operate the positioning unit 243 accordingly, i.e. drive at least one of the motors to control movement of a corresponding ring segment 2431 along the vertical linear guide rails and/or control movement of a corresponding carriage 2432 along the track on the corresponding ring segment 2431 to dispose one mechanical actuator 242 in a predetermined spatial relationship with the electronic device 21 associated with the specific user. In one example, the connect/disconnect request from the specific user may include one of the following commands:

Position the mechanical actuator 242 in front of the electronic device 21 on row 15 and column 10 and push it one time.

Position the mechanical actuator 242 in front of the electronic device 21 on row 25 and column 42 and push it one time.

With the connection actuator 24, any electronic device 21 in the system 20 is to be connected to the control system 22 only when a connect request from an associated specific user is received and is to be disconnected from the control system 22 when a disconnect request from the associated specific user is received. This will shorten the time of the electronic device 21 in connected state to reduce security risk. Specifically, when the electronic device 21 is in disconnected state, there is an air barrier or air-gapping between the electronic device 21 and the control system 22, thereby unauthorized access or communication with the electronic device 21 is prevented since it is impossible to power up or connect to the electronic device 21.

It should be noted that in some embodiments, the control system 22 may be configured to power down an electronic device 21 in connected state in response to a disconnect request from an associated specific user before the connection actuator 24 disconnects the electronic device 21 from the control system 22 in response to the disconnect request.

Communication Platform

As shown in FIG. 9, in some embodiments, a specific user may communicate with the system 20 for storage and management of confidential information through a communication platform 25, e.g., a cloud-hosted system. The system 20 may further include a web application or a mobile application which is configured to provide a user interface to allow the specific user to communicate with the control system 22 through a communication platform 25 which is communicably coupled between the control system 22 and the web application or the mobile application.

In some embodiments, the communication platform 25 may be configured to communicate any service request from the specific user to the control system 22.

In some embodiments, the communication platform 25 may be further configured to communicate any connect or disconnect request from the specific user to the connection actuator 24.

In some embodiments, the communication platform 25 may be further configured to communicate any power regulation request from the specific user to the control system 22.

In some embodiments, the communication platform 25 may be further configured to authenticate the specific user, and/or communicate a status report request to the control system 22, and communicate a status report of any one of electronic devices 21 received from the control system 22 to an associated specific user or an authorized administrator.

Data Center

Figure 11:
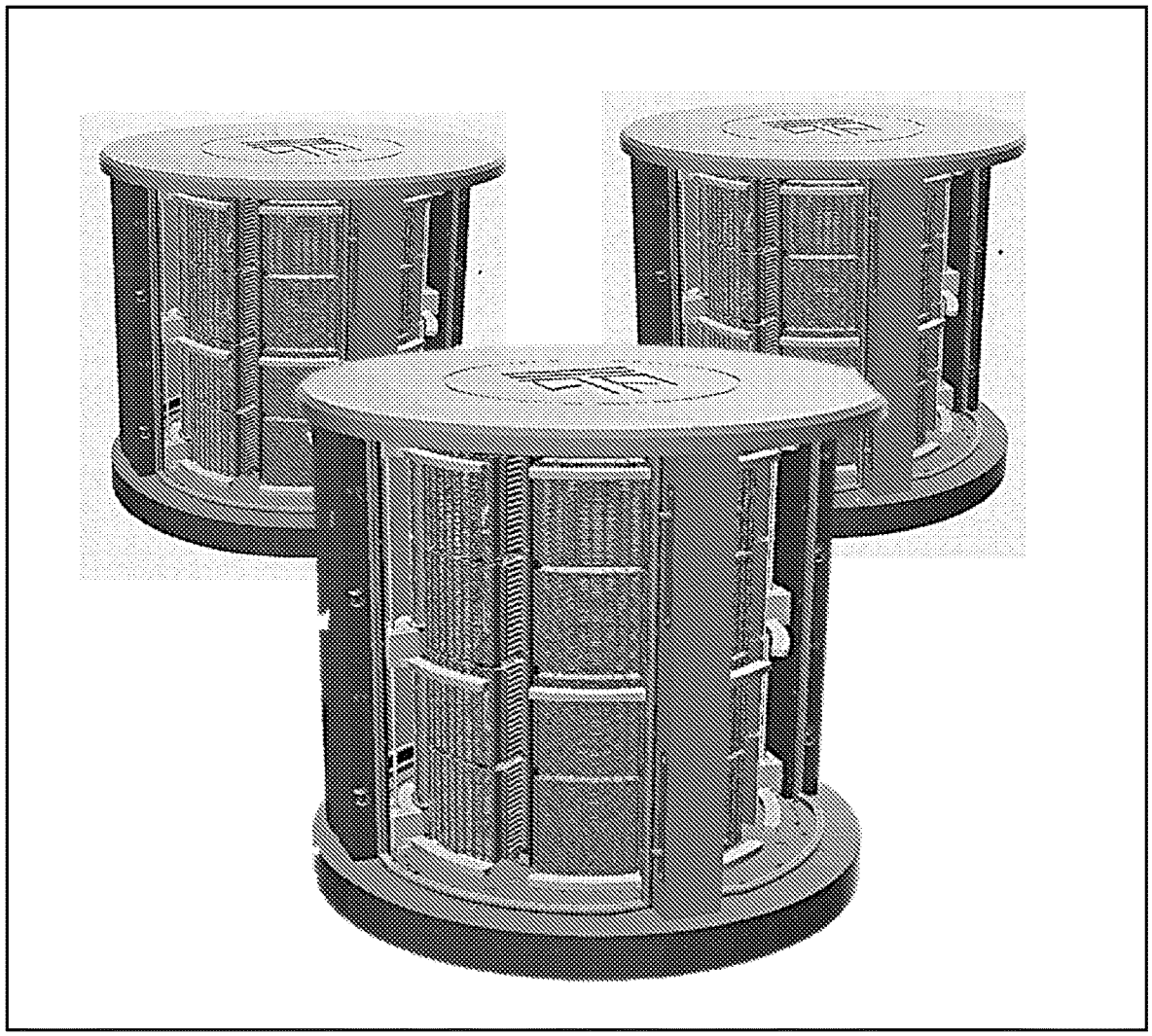
FIG. 11 shows a data center including a plurality of systems for storage and management of confidential information according to one embodiment of the invention.

In some embodiments of the invention, a data center may be provided which may include a plurality of systems 10 and/or systems 20. FIG. 11 shows an example of the data center which includes a plurality of systems 20.

In this example, the control system 22 includes 16 sub-control systems and each sub-control system is configured to provide power supply and communicate with 512 electronic devices 21. Each sub-control system is controlled by two Ethernet cables, one for a power bus and the other one for a data bus. As such, there are total 32 Ethernet cables for all the sub-control systems hosted in the enclosure 23.

In order to reduce the number of physical Ethernet cables emerging from the enclosure 23, one power bus Ethernet switch is used to group together or congregate the Power Bus Ethernet interfaces, and one data bus Ethernet switch is used to group together or congregate the Data Bus Ethernet interfaces. This way, there will be only 2 Ethernet cables coming out of the enclosure 23, one for power bus and the other one for data bus. It should be noted that in other embodiments, more than two Ethernet switches may be used to group together or congregate the Power Bus Ethernet interfaces and the Data Bus Ethernet interfaces in the system.

In this embodiment, each sub-control system requires a power supply about 75 W of power. A 150 W PSU is used to provide power to 2 sub-control systems at the same time. To provide power supply for the 16 sub-control systems at the same time, total eight 150 W PSUs are used in this embodiment. The PSUs are mounted on DIN rails inside a column in the enclosure 33 and connected to a main power supply cable.

In this embodiment, the electronics of the control system 22 are mounted on the internal frame of the enclosure 23 using mechanical methods such as brackets and screws.

In this embodiment, other than the two Ethernet cables for power bus and data bus coming out of the enclosure 23, one more Ethernet cable is provided for the connection actuator 24. Therefore, total of three Ethernet cables emerging from the enclosure 23.

These cables are to be connected to an external virtual private network (VPN) router hosted near the enclosure 23 in the same data center. The VPN router is then connected to an external network reachable from the communication platform 25, e.g., a private WAN or the Internet.

The communication platform 25 is hosted on a cloud platform and achieves network connectivity to the same VPN router. Through this connectivity, the communication platform 25 connects to the enclosure 23, more specifically to the control system 22 and the connection actuator 24 to communicate with them.

Backup Strategy

An augmented configuration of the invention is the deployment of the systems for storage and management of confidential information proposed in embodiments of the invention in geographically separate locations, and then store the same cryptographic keys on electronic devices hosted in different systems/enclosures. This provides a backup strategy so that should the electronic device in one of the systems be damaged through disaster, hardware faults, and so on, the electronic devices in other systems still could preserve the integrity of the confidential information.

Methods for Storage and/or Management of Confidential Information

Figure 12:
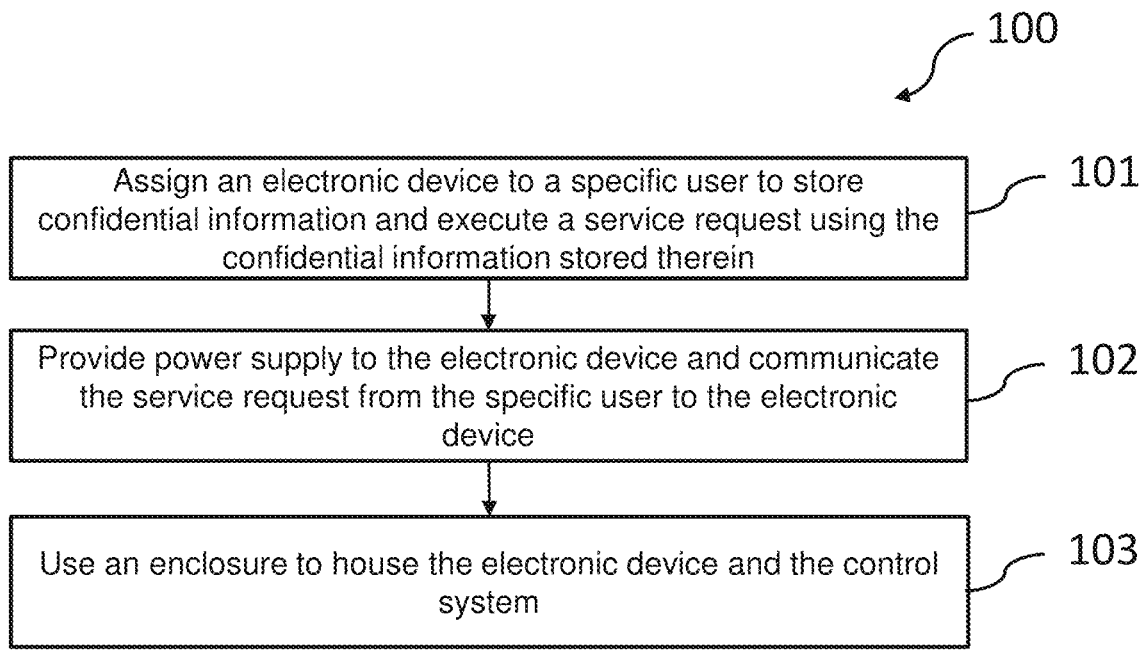
FIG. 12 is a flow chart illustrating a method for storage and management of confidential information according to some embodiments of the invention.

Embodiments of the invention also provide a method for storage and management of confidential information. FIG. 12 is a flow chart illustrating a method 100 for storage and management of confidential information according to some embodiments of the invention.

In block 101, an electronic device is assigned to a specific user to store confidential information and execute a service request using the confidential information stored therein.

In block 102, a control system is used to provide power supply to the electronic device which is connected to the control system, and communicate the service request from the specific user to the electronic device.

In block 103, an enclosure is used to house the electronic device and the control system.

Figure 13:
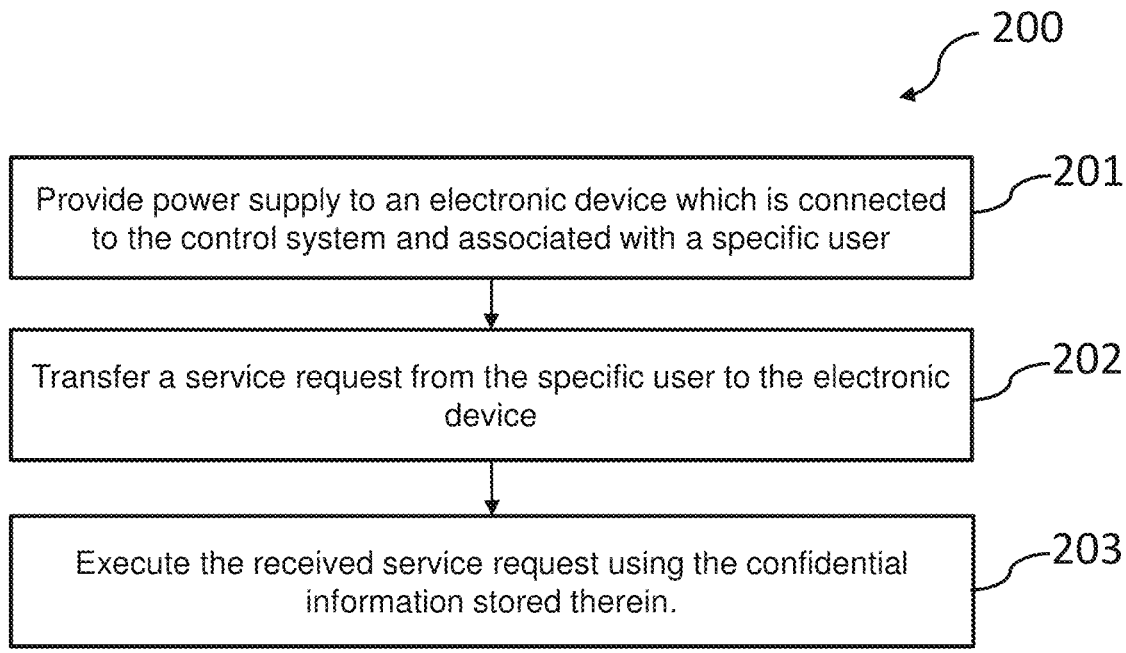
FIG. 13 is a flow chart illustrating a method for management of confidential information according to some embodiments of the invention.

Embodiments of the invention also provide a method for confidential information management. FIG. 13 is a flow chart illustrating a method 200 for management of confidential information according to some embodiments of the invention. This method describes the process of management of confidential information after an electronic device has been assigned to a specific user and used for storing confidential information associated with this specific user.

In block 201, a control system provides power supply to an electronic device which is connected to the control system and associated with a specific user.

In block 202, the control system transfers a service request from the specific user to the electronic device.

In block 203, the electronic device executes the received service request using the confidential information stored therein.

In some embodiments, the confidential information may include cryptographic key.

In some embodiments, to further improve security of the confidential information stored in the electronic device, the method may further include:

before providing power supply to the control system, a connection actuator connects the electronic device to the control system to attain connected state in response to a connect request from the specific user; and after executing the received service request, the connection actuator disconnects the electronic device from the control system to attain disconnected state in response to a disconnect request from the specific user.

In some embodiments, to further improve security of the confidential information stored in the electronic device, the method may further include:

the control system powers up the electronic device in connected state in response to a power regulation request, which is from the specific user, to power up the electronic device, and/or power down the electronic device in connected state in response to a disconnect request or a power regulation request, which is from the specific user, to power down the electronic device.

In some embodiments, the control system includes at least one sub-control system and each sub-control system includes at least one second connector, a power bus, and a data bus, wherein the power bus includes a CCU, a plurality of slave MCU and a plurality of EPS, wherein the step of powering up the electronic device may comprise:

transferring, by a CCU of the power bus, a power regulation request, which is from the specific user, to power up the electronic device to a corresponding slave MCU to activate a corresponding EPS, thereby powering up the electronic device;

wherein the step of powering down the electronic device may comprise:

transferring, by a CCU of the power bus, a disconnect request or a power regulation request, which is from the specific user, to power down the electronic device to a corresponding slave MCU to deactivate a corresponding EPS, thereby powering down the electronic device.

In some embodiments, the control system includes at least one sub-control system and each sub-control system includes at least one connector, a power bus, and a data bus, wherein the data bus includes a CCU and a plurality of UARTs, wherein the step of transferring a service request received from the specific user to the electronic device may comprise:

transferring, by the CCU of the data bus, a service request from the specific user to the electronic device through a corresponding UART.

In some embodiments, the step of connecting the electronic device to a control system may include:

actuating, by the connection actuator, the electronic device to engage a first connector of the electronic device with a complementary second connector of the control system; and wherein the step of disconnecting the electronic device from the control system may include:

actuating, by the connection actuator, the electronic device to release the first connector of the electronic device from the complementary second connector of the control system.

In some embodiments, the connection actuator includes a positioning unit, a mechanical actuator attached to the positioning unit and a CCU, wherein the step of connecting the electronic device to the control system may include:

receiving, by the CCU, a connect request from the specific user, controlling, by the CCU, the positioning unit to dispose the mechanical actuator in a predetermined spatial relationship with the electronic device, and controlling, by the CCU, the mechanical actuator to actuate the electronic device to engage the electronic device with the control system;

wherein the step of disconnecting the electronic device from the control system comprises:

receiving, by the CCU, the disconnect request from the specific user, controlling, by the CCU, the positioning unit to dispose the mechanical actuator in a predetermined spatial relationship with the electronic device, and controlling, by the CCU, the mechanical actuator to actuate the electronic device to engage the electronic device with the control system.

In some embodiments, the step of executing the service request may include one of the following operations:

generating and storing, by the electronic device, at least one cryptographic key pair for the specific user using SE, signing, by the electronic device, a blockchain transaction using the stored cryptographic key, authenticating, by the electronic device, a service request received from the control system by verifying a digital signature included in the service request, generating, by the electronic device, a tree of cryptographic key pairs from a seed key stored in the electronic device, or receiving, by the electronic device, a third party's digital signature from the specific user to authorize the third party to make a service request to the electronic device and executing the service request from the third party.

In some embodiments, the control system may further communicate an output of the service request to the specific user.

In some embodiments, a web application or a mobile application may be used to provide a user interface to allow the specific user to communicate with the control system through a communication platform which is communicably coupled between the control system and the web application or the mobile application.

Figure 14:
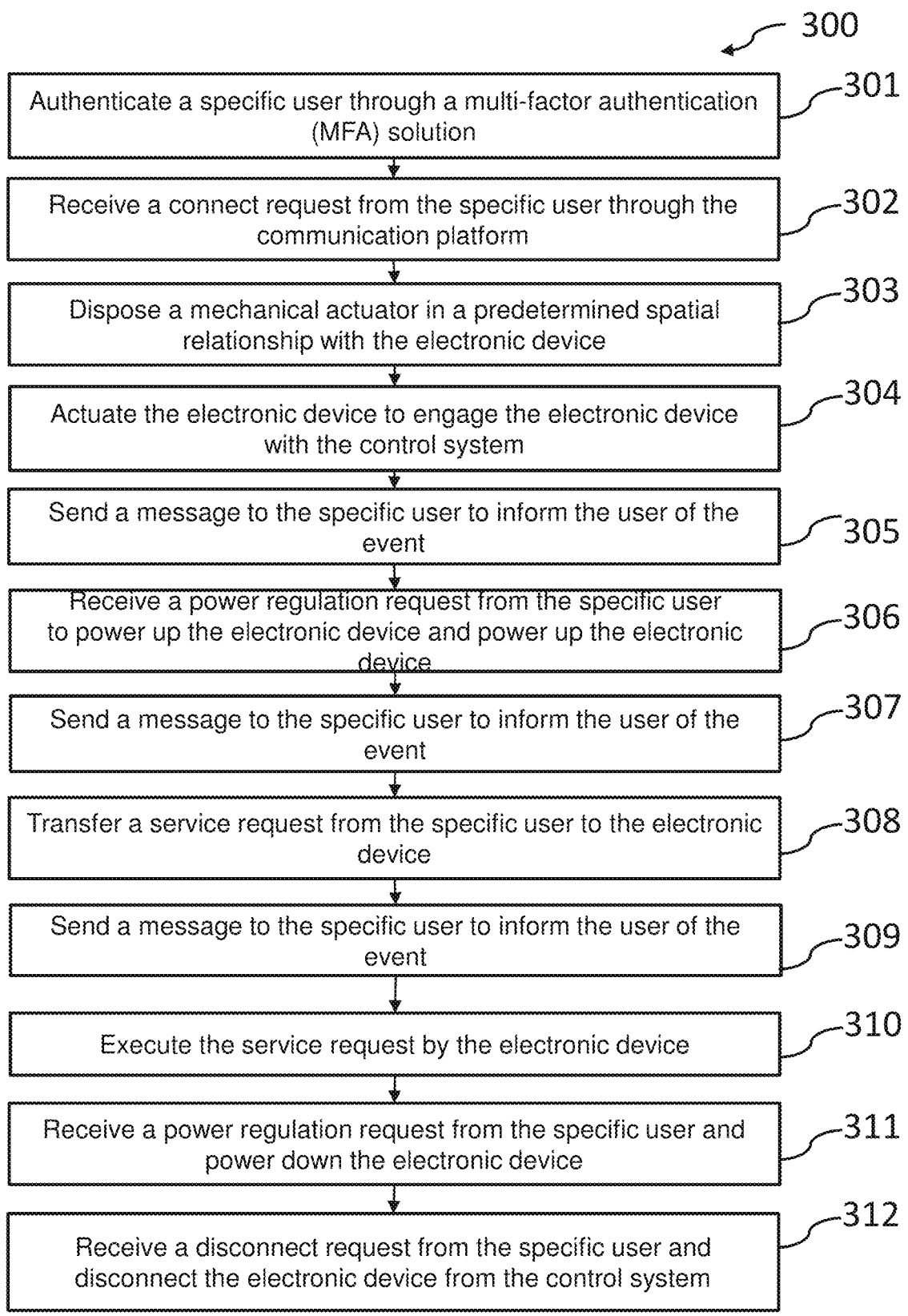
FIG. 14 is a flow chart illustrating a method for management of cryptographic key(s) according to some embodiments of the invention.

FIG. 14 is a flow chart illustrating a method for management of cryptographic key according to some embodiments of the invention. In this method, one electronic device has been assigned to a specific user to store cryptographic key.

In block 301, a communication platform authenticates a specific user through a multi-factor authentication (MFA) solution.

In block 302, a connection actuator receives a connect request sent from the specific user through the communication platform.

Preferably, to prevent man-in-middle attacks, the connect request may be digitally signed in some embodiments of the invention.

Alternatively, in other embodiments, the connect request may be sent from the specific user to the control system if the connection actuator itself does not include a CCU for executing the connect request and controlling the connection process.

In block 303, a mechanical actuator of the connection actuator is disposed in a predetermined spatial relationship with the electronic device, e.g., in front of the electronic device with a small gap therebetween.

In block 304, the mechanical actuator is controlled to actuate the electronic device to engage the electronic device with the control system.

In one example, the mechanical actuator is controlled to push the electronic device so that the male microSD connector of the electronic device is engaged with a corresponding female microSD connector of the control system.

In block 305, the connection actuator sends a message to the specific user to inform the user of the event through the communication platform.

In block 306, the control system receives a power regulation request from the specific user to power up the electronic device through the communication platform and powers up the electronic device.

In block 307, the control system sends a message to the specific user to inform the user of the event.

In block 308, the control system receives a service request from the specific user through the communication platform and transfers the received service request to the electronic device.

If the control system is configured to control communication between a plurality of electronic devices and the corresponding specific users through different UARTs, the control system may transfer the received service request to the electronic device through a corresponding UART.

In block 309, the control system sends a message to the specific user to inform the user of the event.

In block 310, the electronic device executes the received service request.

In block 311, the control system receives a power regulation request from the specific user to power down the electronic device through the communication platform and powers down the electronic device.

In block 312, the connection actuator receives a disconnect request from the specific user through the communication platform and disconnects the electronic device from the control system.

With the system and method proposed by embodiments of the invention, the confidential information, e.g., cryptographic key, is stored in a secure electronic device, and the electronic device is hosted in a secure enclosure to protect it from unauthorized access and damages due to exposure to external environment. The system and method proposed by embodiments of the invention therefore can fulfil the secure storage requirements for confidential information. At the same time, a control system is used to control power supply to the electronic device and communication between the specific user and the electronic device so that the confidential information stored in the electronic device can be accessed on-demand, e.g., easily and quickly as a need arises. The owners of the confidential information need not secure the electronic devices themselves. In view of the above, embodiments of the invention provide an effective solution for storage and management confidential information which can securely store the confidential information and offer ready access to the confidential information simultaneously.

Further, to provide higher level security from malicious electronic and physical attacks, in some embodiments of the invention, a power control mechanism is used to control power up and power down of the electronic device in response to a power regulation request from the specific user. In some embodiments, a connection control mechanism is used to control the connection between the electronic device and the control system to minimize the accessible time of the electronic device.

The system proposed by embodiments of the invention may be used to store and manage a plurality of electronic devices. Also, a backup strategy is proposed by storing the same confidential information in different systems disposed in different locations. As such, if the electronic devices in one of the systems were destroyed due to disaster, hardware faults, and so on, the other systems still could preserve the integrity of the confidential information to preserve the integrity of the confidential information stored in the electronic devices.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A system for storage and management of confidential information, the system comprising:
 a plurality of electronic devices, wherein each electronic device is configured to store confidential information and execute a service request using the confidential information stored therein, wherein each electronic device includes a first hardware connector;
 a controller configured to provide power supply to can electronic device of the plurality of electronic devices, which is connected to the controller, and communicate the service request from a specific user to an electronic device of the plurality of electronic devices, in a connected state, that is associated with the specific user,
 wherein the controller includes at least one sub-controller that includes at least one second hardware connector, a power bus, and a data bus, wherein:
 each of the at least one second hardware connector is configured to engage with the first hardware connector of an electronic device of the plurality of electronic devices to connect the electronic device to the power bus and the data bus;
 the power bus includes a power central control unit (CCU) which is configured to, in response to a first power regulation request received from a specific user associated with the electronic device, to power up the electronic device in the connected state, or a second power regulation request received from the specific user to power down the electronic device in the connected state;
 wherein the power bus further includes a plurality of slave microcontroller units (MCUs) and a plurality of electronic power switches (EPSs), wherein each slave MCU is communicably coupled between the CCU of the power bus and a subset of the plurality of EPSs, and wherein each EPS is associated with an electronic device of the plurality of electronic devices, and wherein the CCU of the power bus is further configured to transfer the first power regulation request received from the specific user to a corresponding slave MCU to activate a corresponding EPS so as to power up the electronic device associates with the specific user, or transfer the second power regulation request received from the specific user to the corresponding slave MCU to deactivate the corresponding EPS so as to power down the electronic device; and wherein the data bus includes a data CCU which is configured to:

transfer the service request, received from the specific user, to the associated electronic device in the connected state; and a hardware enclosure configured to house the plurality of electronic devices and the controller.

2. The system according to claim 1, further comprising: a hardware connection actuator configured to connect any one of the plurality of electronic devices, which is associated with a specific user, to the controller to attain a connected state in response to a connect request from the specific user and further configured to disconnect the electronic device from the controller to attain a disconnected state in response to a disconnect request from the specific user.

3. The system according to claim 1, wherein each electronic device comprises a first hardware connector, a secure element (SE), and a microcontroller unit (MCU), and wherein:

the first hardware connector is configured to engage with the controller;

the SE is configured to store the confidential information; and the MCU is configured to execute a service request using the confidential information stored in the SE.

4. The system according to claim 3, wherein the confidential information includes a cryptographic key, and wherein the MCU of each electronic device is further configured to:

generate and store at least one cryptographic key pair for a specific user associated with the electronic device using SE, sign a blockchain transaction using the stored cryptographic key, authenticate the service request received from the controller by verifying a digital signature included in the service request, generate a tree of cryptographic key pairs from a seed key stored by the electronic device, and/or receive a third party digital signature from the associated specific user to authorize the third party to make a service request to the electronic device; and execute the service request.

5. The system according to claim 1, wherein the data bus further includes a plurality of Universal Asynchronous Receiver/Transmitter interfaces (UARTs), wherein each UART is communicably coupled between the CCU of the data bus and a subset of the plurality of electronic devices, and wherein the CCU is further configured to transfer a service request from a specific user to an associated electronic device through a corresponding UART.

6. The system according to claim 5, wherein the controller includes a plurality of sub controllers, wherein the controller further includes at least one power bus Ethernet switch and at least one data bus Ethernet switch, wherein each power bus Ethernet switch is connected to power buses of a subset of the sub controllers, and wherein each data bus Ethernet switch is connected to data buses of a subset of the sub controllers.

7. The system according to claim 1, wherein the hardware enclosure includes a base, a roof, and an outer wall connecting between the base and the roof, and wherein the outer wall includes two parts of rigid material which are hingedly coupled to each other on one side and detachably securable to each other on the other side.

8. The system according to claim 7, wherein the the hardware enclosure includes a metal cage interposed between the outer wall, the plurality of electronic devices, and the controller.

9. The system according to claim 7, wherein the hardware enclosure further includes an internal frame, and wherein the controller is mounted on the internal frame.

10. The system according to claim 9, wherein the internal frame includes a left part, a right part and a fixed column, and wherein both the left part and the right part are hingedly coupled to the fixed column.

11. The system according to claim 2, wherein the hardware connection actuator includes a CCU and at least one mechanical actuator, wherein the CCU is configured to receive the connect request or the disconnect request from the specific user, and control one of the at least one mechanical actuator to actuate the electronic device associated with the specific user so as to toggle the electronic device from the connected state to the disconnected state or vice versa.

12. The system according to claim 11, wherein the hardware connection actuator further includes a positioning unit, and wherein the CCU is further configured to control the positioning unit to dispose the one of the at least one mechanical actuator in a predetermined spatial relationship with the electronic device associated with the specific user.

13. The system according to claim 12, wherein the positioning unit includes:

a main body movably coupled to a plurality of fixed guide rails, wherein the at least one mechanical actuator is mounted on the main body; and a motor configured to control movement of the main body along the guide rails.

14. The system according to claim 12, wherein the positioning unit includes:

a main body movably coupled to a plurality of fixed guide rails, a carriage movably mounted on a track on the main body, wherein the at least one mechanical actuator is mounted on the carriage, and at least one motor configured to control movement of the main body along the guide rails and movement of the carriage along the track.

15. The system according to claim 1, wherein the controller is further configured to perform one or more of:

communicating an output of the service request from the electronic device in a connected state to the associated specific user, or communicating the output to a communication platform, wherein the communication platform is configured to broadcast the output to one or more than one predetermined address.

16. The system according to claim 1, further comprising an application, wherein the application is one or more of: a web application or a mobile application, wherein the application is configured to provide a user interface to allow the specific user to communicate with the controller through a communication platform which is communicably coupled between the controller and the application.

17. The system according to claim 16, wherein the communication platform is further configured to perform one or more of:
- authenticating the specific user,
- communicating a status report request to the controller,
- communicating a status report, received from the controller, of any one of the plurality of electronic devices to an associated specific user or an authorized administrator,
- receiving an output of the service request from the controller and broadcast the received output to one or more than one predetermined address.

18. A method for confidential information management, the method comprising:
providing, by a controller, power supply to an electronic device of a plurality of electronic devices, wherein the electronic device is associated with a specific user and includes a first hardware connector, the controller including at least one sub-controller, wherein each sub-controller includes at least one second hardware connector, a power bus, and a data bus, wherein the first hardware connector of the electronic device is engaged with the second hardware connector of the controller to connect the electronic device to the power bus and the data bus,
wherein the power bus includes a CCU, a plurality of slave MCU and a plurality of EPS, wherein each slave MCU is communicably coupled between the CCU of the power bus and a subset of the plurality of EPSs, and wherein each EPS is associated with an electronic device of the plurality of electronic devices, and
wherein providing the power supply comprises:
powering up, by the controller, the electronic device in a connected state in response to a first power regulation request, received from the specific user, to power up the electronic device, wherein powering up the electronic device comprises transferring, by a CCU of the power bus, the first power regulation request, from the specific user, to power up the electronic device to a corresponding slave MCU to activate a corresponding EPS, thereby powering up the electronic device;
transferring, by the controller, a service request from the specific user to the electronic device;
executing, by the electronic device, the received service request using confidential information stored therein; and
powering down, by the controller, the electronic device in the connected state in response to a power regulation request, received from the specific user, to power down the electronic device, wherein powering down the electronic device comprises transferring, by a CCU of the power bus, the second power regulation request, from the specific user, to power down the electronic device to a corresponding slave MCU to deactivate a corresponding EPS, thereby powering down the electronic device;
before providing power supply to the electronic device, connecting, by a hardware connection actuator, the electronic device to the controller by engaging the first hardware connector of the electronic device with the second hardware connector of the controller to attain the connected state in response to a connect request from the specific user; and
after executing the received service request, disconnecting, by the hardware connection actuator, the electronic device from the controller by disengaging the first hardware connector of the electronic device with the second hardware connector of the controller to attain a disconnected state in response to a disconnect request from the specific user.

19. The method according to claim 18, wherein the data bus includes a CCU and a plurality of UARTs, and
wherein the step of transferring a service request received from the specific user to the electronic device, comprises:
transferring, by the CCU of the data bus, a service request received from the specific user to the electronic device through a corresponding UART.

20. The method according to claim 18, wherein the hardware connection actuator includes a positioning unit, a mechanical actuator attached to the positioning unit, and a CCU,
wherein connecting the electronic device to the controller further comprises:
receiving, by the CCU, a connect request from the specific user,
controlling, by the CCU, the positioning unit to dispose the mechanical actuator in a predetermined spatial relationship with the electronic device, and
controlling, by the CCU, the mechanical actuator to actuate the electronic device to engage the first hardware connector of the electronic device with the second hardware connector of the controller;
wherein disconnecting the electronic device from the controller comprises:
receiving, by the CCU, the disconnect request from the specific user;
controlling, by the CCU, the positioning unit to dispose the mechanical actuator in a predetermined spatial relationship with the electronic device; and
controlling, by the CCU, the mechanical actuator to actuate the electronic device to disengage the first hardware connector of the electronic device with the second hardware connector of the controller.

21. The method according to claim 18, wherein the step of executing the service request comprises:
generating and storing, by the electronic device, at least one cryptographic key pair for the specific user using SE;
signing, by the electronic device, a blockchain transaction using the stored cryptographic key;
authenticating, by the electronic device, a service request received from the controller by verifying a digital signature included in the service request;
generating, by the electronic device, a tree of cryptographic key pairs from a seed key stored in the electronic device; or
receiving, by the electronic device, a third party's digital signature from the specific user to authorize the third party to make a service request to the electronic device, and executing the service request from the third party.

22. The method according to claim 18, further comprising: communicating, by the controller, an output of the service request to the specific user.

23. The method according to claim 18, further comprising:
providing an application, wherein the application is one or more of: a web application or a mobile application, and wherein the application provides a user interface to allow the specific user to communicate with the controller through a communication platform which is communicably coupled between the controller and the web application or the mobile application.

24. The method according to claim 23, further comprising:
 performing one or both of:
  authenticating, by the communication platform, the specific user; or
  communicating, by the communication platform, a status report request to the controller; and
 communicating, by the communication platform:
  a status report of the electronic device received from the controller to the specific user, or
  a status report of one or more than one electronic device received from the controller to an authorized administrator.

* * * * *